United States Patent [19]

Briscoe

[11] Patent Number: 5,031,321
[45] Date of Patent: Jul. 16, 1991

[54] CLEAVING APPARATUS

[75] Inventor: Robert J. Briscoe, Woodbridge, England

[73] Assignee: British Telecommunications public limited company, London, England

[21] Appl. No.: 217,067

[22] PCT Filed: Nov. 5, 1987

[86] PCT No.: PCT/GB87/00786
§ 371 Date: Jul. 8, 1988
§ 102(e) Date: Jul. 8, 1988

[87] PCT Pub. No.: WO88/03516
PCT Pub. Date: May 19, 1988

[30] Foreign Application Priority Data
Nov. 10, 1986 [GB] United Kingdom ............... 8626786
Oct. 9, 1987 [GB] United Kingdom ............... 8723794

[51] Int. Cl.$^5$ .......................................... B25F 3/00
[52] U.S. Cl. ........................................ 30/134; 30/901
[58] Field of Search .................. 30/90.1, 90.2, 90.3, 30/90.4, 90.6, 90.7, 90.8, 91.2, 92.5, 134

[56] References Cited
U.S. PATENT DOCUMENTS
2,459,864  1/1949  Bissett et al. ..................... 30/134

FOREIGN PATENT DOCUMENTS
0082897  7/1983  European Pat. Off. .
0089845  9/1983  European Pat. Off. .
0167313  1/1986  European Pat. Off. .
1519232  7/1978  United Kingdom .
2174085  10/1986  United Kingdom .

Primary Examiner—Timothy V. Eley
Assistant Examiner—Willmon Fridie, Jr.
Attorney, Agent, or Firm—Nixon & Vanderhye

[57] ABSTRACT

Apparatus for cleaving an optical fiber comprises two hand-operated pivoted jaws (11 and 12). The optical fiber (15) is supported along the lower jaw (12) and held by resilient clamps (24 and 27) on the upper jaw (11) when the jaws are closed. A blade (18) is resiliently coupled to the upper jaw on a parallelogram linkage (20) and protrudes beyond a stop member (21) by an amount substantially equal to the intended depth of intrusion of the blade into the fiber. Closure of the jaws brings the blade against the fiber which it scores to a depth limited by the stop member (21) on the upper jaw (11) bearing against the upper surface of the fiber (15), and by yielding of the blade (18). The resilient mounting (20) of the blade (18) is such that the maximum force which can be applied to the blade is the amount required to produce a score of the desired depth. Further closure of the jaws then applies a longitudinal tension to the fiber to produce cleaving.

22 Claims, 9 Drawing Sheets

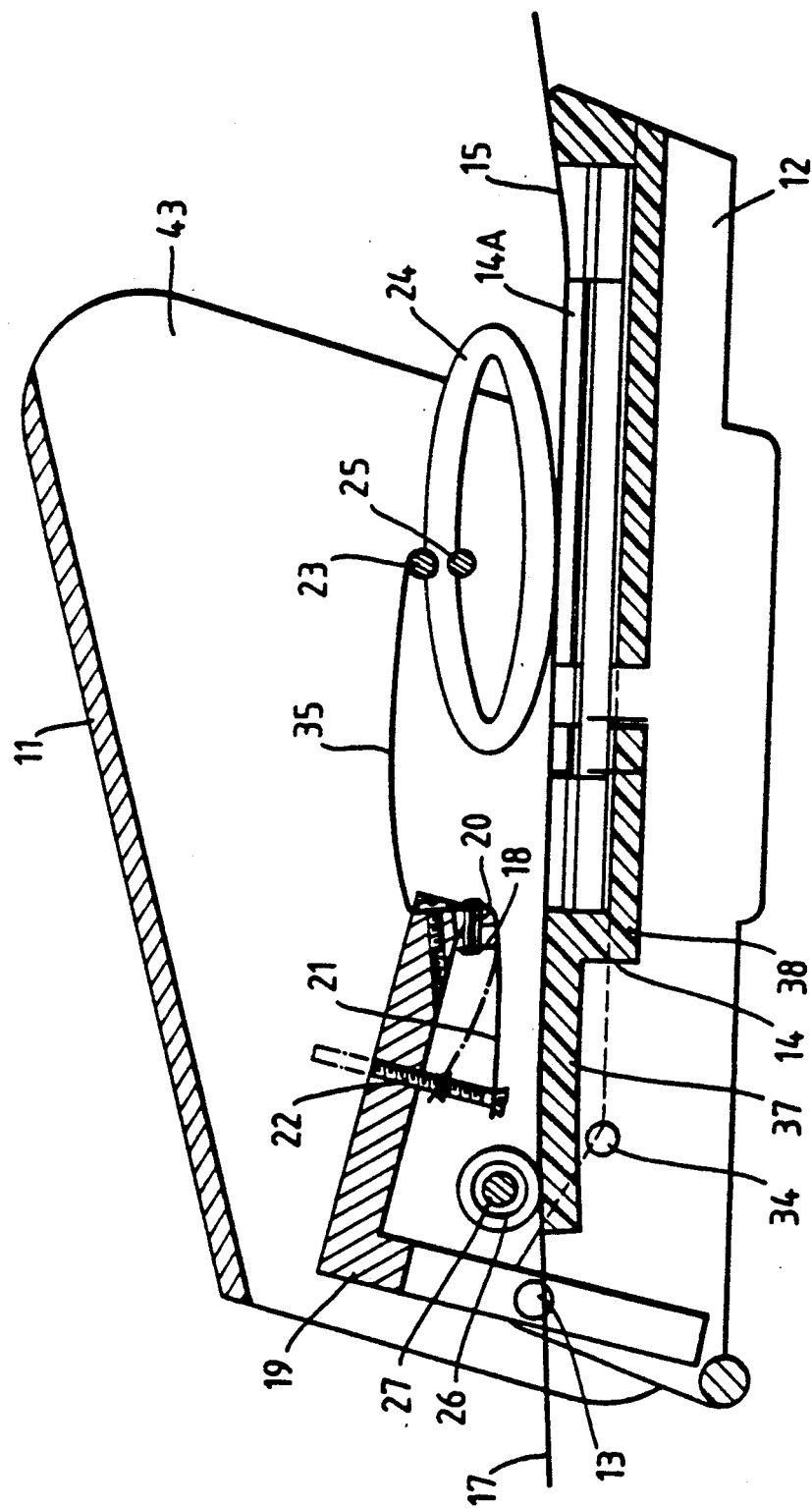

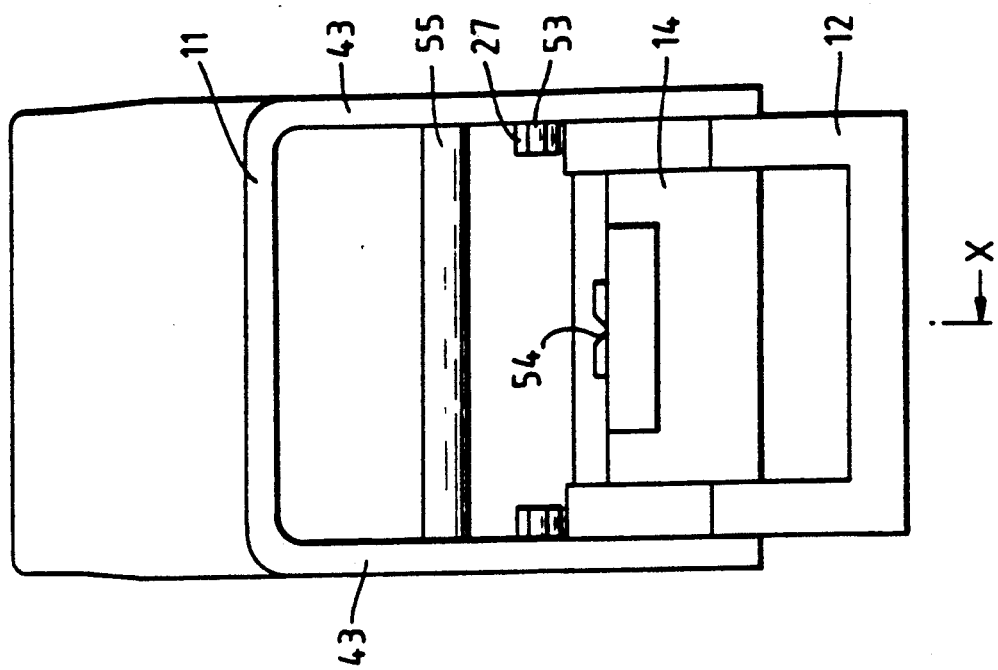
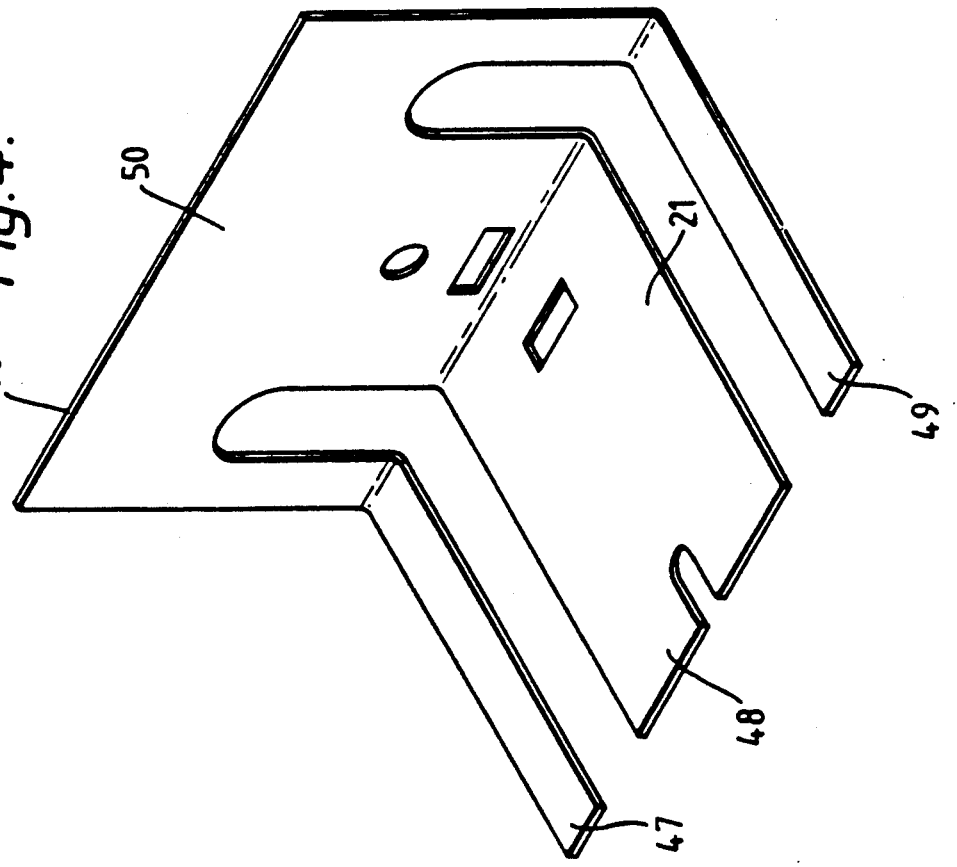

CLEAVING APPARATUS

FIELD OF THE INVENTION

The present invention relates to cleaving apparatus particularly but not exclusively for use in the field of optical communications for cleaving optical fibres.

BACKGROUND AND SUMMARY OF THE INVENTION

Optical fibres generally comprise filaments of optically transparent, non-ductile, "glassy" materials, for example vitreous silica, boro-silicate, or metal fluoride glasses. To enable guided transmission to take place, the fibres require a core and a cladding. Occasionally the function of the cladding may be performed by, for example, the surrounding air. In practice, however, optical fibres employed to transmit information usually have cores and claddings.

Different types of optical fibre will have different dimensions associated with them but, generally, the outer diameter varies (with fibre type) over a range of from 60 microns to 250 microns.

When optical power is to be transmitted into or out of the end of an optical fibre, the geometric characteristics of the fibre end affect the manner in which the power is transmitted. It is usually desirable that the fibre should be provided with a flat end face which lies perpendicular to the longitudinal axis of the fibre. For instance if two fibres for use in optical communications are to be fusion joined, it is known that if either end face is not perpendicular, optical power loss can be significantly increased at the joint. Where a major part of the optical power is carried by a fibre core, this power loss can be substantial, and monomode fibres are known to be particularly susceptible as a result of their small core diameters. Typically the core diameter is about 8 microns and the overall diameter including core and cladding is in the region of 125 microns.

An acceptable fibre end face can be obtained by clamping the fibre under a controlled axial tension and striking it on its outermost glass surface with a cleaver blade. The blade scores the fibre by entering the fibre to a very small depth relative to the diameter of the fibre, and the cleaving is effected by the longitudinal tension in the fibre. The tension may be applied during, or after, the scoring. In some known cleaving tools the cleaver blade may be mounted on a lever which drops under the influence of gravity and/or a spring to bring the blade into contact with the fibre.

In our prior European patent application, publication No: EP-A-0 152 289 (British Telecommunications) a cleaver blade is mounted as part of a rotatable cleaver assembly which is balanced about its axis of rotation. The cleaver blade is attached to an arm which extends radially from the wheel and strikes the fibre upon rotation of the wheel. A stop attached to the wheel abuts against a reference surface being adjustable. Although this apparatus has found wide acceptance, and gives improved and acceptable cleaving, the accuracy of cleaving can be reduced after operation in adverse environments. For example the blade may intrude too far into the fibre due to inaccuracy in calibration arising from temperature effects. Poor cleaving can also arise from physical jogging of the apparatus during the scoring operation. It is an object of the present invention to provide an apparatus which is more robust and less subject to poor cleaving in adverse conditions when used in the field.

Another known apparatus for cleaving optical fibres is a device in which the fibre is held manually at one end on a leaf spring support, and is clamped at the other end by a pivotable jaw carrying the cleaver blade. In operation the jaw carrying the cleaver blade is moved towards the fibre on the leaf spring by operation of one hand, the other hand holding the main end of the fibre in place, and scoring is effected by the blade being lightly pressed against the fibre. The blade is yieldable by retracting into a bore against spring pressure after the score has been made, and the moving jaw is stopped eventually by resting against the leaf spring on either side of the fibre. After scoring, an axial tension is applied by bending the leaf spring to stretch the fibre over the bend of the leaf spring. Operation of the device requires considerable operator skill, since a satisfactory score depends upon the operator touching the blade against the fibre lightly and gently.

It is another object of the present invention to provide apparatus for cleaving optical fibres which is less dependent upon operator skill that previously known devices.

According to the present invention in a first aspect, there is provided cleaving apparatus comprising means for supporting a fibre to be cleaved, and a blade for scoring the fibre to a predetermined depth prior to cleaving by applying tension along the length of the fibre, in which the apparatus includes means for limiting to a required amount the distance to which the blade may intrude into the fibre by abutment of a stop member against a reference surface, means for adjusting the distance limit effected by the abutment of the stop member against the reference surface, and means for limiting to a required amount the distance to which the blade may intrude into the fibre by limiting the force which may be applied to urge the blade into the fibre during scoring.

It is particularly preferred that the stop member should be arranged in operation to rest against the surface of the fibre on that side of the fibre which is to be scored, which surface constitutes the said reference surface.

It is another preferred feature of the invention that, when the stop member is arranged to rest against the surface of the fibre to be scored, the blade protrudes towards the fibre in operation beyond the magnitude as the distance to which the blade is intended to intrude into the fibre during scoring that is to say approximately within the range 1 to 10 times the required intrusion depth. A preferred range of intrusion is the range 1 to 1.5 times the required intrusion depth. Preferably the blade protrudes beyond the stop member by a distance substantially equal to the distance the blade is intended to intrude into the fibre.

Preferably there is provided means for adjusting the position of the stop member relative to the blade, and in a particularly preferred form the stop member comprises a leaf spring which is fixed at one end and which is arranged to about the reference surface close to the fixed end of the leaf spring, the adjustment means being arranged to vary the position of the end of the leaf spring remote from the fixed end.

In general it is a preferred feature of the invention that the part of the stop member which abuts the reference surface in operation should be positioned closely adjacent the blade.

Considering now the said means for limiting the force applied to the blade, conveniently the force limiting means may comprise resilient biassing means for urging the blade towards the fibre, the biassing means being arranged to be yieldable when the force applied during scoring has reached the required limit. Conveniently the biassing means is arranged to be yieldable before the force applied during scoring has reached the required limit. It is particularly preferred that the resilient biassing means is pre-stressed so as to be unyielding during initial intrustion of the blade into the fibre.

In one convenient form, the resilient biassing means comprises a parallelogram linkage of two spaced-apart spring members allowing movement of the blade parallel to a mount against a resilient biassing force provided by the two spring members.

Although it is possible that the fibre may be tensioned separately from the apparatus to achieve the actual cleave, it will normally be arranged that the apparatus according to the invention includes means for applying tension along the length of the fibre to cleave the fibre at the scored position. Conveniently the cleaving tension is applied after scoring has been achieved.

In a particularly preferred form, the apparatus includes two hand-operated jaws adapted to be moved towards each other during operation by manual movement, the jaws being coupled to the blade and the tensioning means in such a manner that a single closing motion of the jaws effects both the scoring and tensioning operations to achieve cleaving. Preferably the single closing motion of the jaws also effects clamping of the fibre during tensioning, and effects movement of the blade away from the fibre after scoring and before cleaving.

Conveniently the apparatus includes first and second clamping means for clamping respectively the main portion and the waste portion of the fibre with the blade positioned between the two clamping means, the jaws being coupled to the clamping means in such a manner the closing of the jaws applies the said clamping means to the fibre automatically.

In a preferred arrangement, the tensioning means comprises a moveable portion of the fibre support means which is moveable by pivoting or bending relative to a main portion of the fibre support means to tension the fibre across the pivot or bend region.

Apparatus according to the invention, at least in preferred embodiments, provides a number of advantages over previously known devices.

In known apparatus for cleaving optical fibres, it has been the practice to limit the scoring depth either by controlling the distance to which the blade may intrude into the fibre by means of a depth stop, or by controlling the force which may be applied to the blade. The present invention provides, in its first aspect, control of both the distance to which the blade may intrude into the fibre, and also the force which may be applied during the scoring. This combination of two forms of control leads to increased reliability of the apparatus and reproducability of the cleaving operation.

By arranging for the stop member to rest against the surface of the fibre to be scored, the depth limitation is made more accurate than in prior devices where a stop member abutted a reference surface set by reference to a support means on which the fibre rested. The manufacturers' tolerance in an optical fibre is usually of the same order as the required score depth. Thus if a stop is set with reference to the surface on which the fibre is resting, the manufacturing error across the diameter may mean that the set stop position for the blade is incorrect by an amount which might equal the whole of the intended score depth. By setting the depth with reference to the surface being scored, a much more accurate limitation can be set on the distance to which the blade intrudes into the fibre.

Where in previous apparatus some limit has been set on the distance by which a blade protrudes from a surrounding housing, this amount has been very much greater than the required scoring depth, and protection against overscoring has been made by relying upon yielding of the blade against a resilient mounting. It is a particular advantage of the present invention that the blade can be arranged to protrude only by a distance of the same order as the distance to which the blade is intended to intrude into the fibre, thus reducing the chances of overscoring due to accidental jogging, or due to sticking of the resilient biassing means intended to provide yielding. Inaccurate cleaving often arises from movement of the blade relative to the fibre during scoring, for example along the length of the fibre or from side to side, and inaccuracies of this kind are reduced if the blade protrudes from a limiting stop member by only a minimum amount.

The preferred arrangement that the stop member abuts the reference surface closely adjacent the blade, reduces inaccuracies arising from temperature effects which produce expansion and retraction of supporting structure, and arising from misalignment and change of position of the blade due to physical shocks.

Considering the means for limiting the force applied to the blade, the preferred arrangement that the resilient biassing means is prestressed gives considerable advantage in that it reduces the time for which the blade is in contact with the fibre during scoring, and consequently reduces the chances of unwanted movement of the blade in a plane perpendicular to the main striking movement of the blade. In known devices where yielding means limit the force applied, a relatively long travel of the blade has been allowed while the required cleaving force builds up in the resilient biassing means. In the preferred form of the invention, the biassing means is prestressed so that the blade applies almost the required full force to the fibre as soon as the blade touches the fibre, with only a small amount of yielding movement before the blade reaches the full required force, and retracts to prevent further scoring.

A first main aspect of the invention has been set out, with preferred features relating to that aspect. There will now be set out further independent aspects of the invention.

In accordance with a second independent aspect of the invention, there is provided cleaving apparatus comprising means for supporting a fibre to be cleaved, a blade for scoring the fibre to a predetermined depth prior to cleaving by applying tension along the length of the fibre, and means for limiting to a required amount the distance to which the blade may intrude into the fibre by abutment of a stop member against a reference surface constituted by the surface of the fibre on that side of the fibre which is to be scored.

In accordance with a third independent aspect of the present invention, there is provided cleaving apparatus comprising means for supporting a fibre to be cleaved, a blade for scoring the fibre to a predetermined depth prior to cleaving by applying tension along the length of the fibre, and means for limiting to a required amount the force which may be applied to urge the blade into the fibre during scoring, the means for limiting force comprising resilient biassing means for urging the blade towards the fibre, the biassing means being arranged to be yieldable when the force applied during scoring has reached the required limit, the resilient biassing means being prestressed so as to be unyielding during initial intrusion of the blade into the fibre.

In accordance with a fourth independent aspect of the invention, there is provided cleaving apparatus comprising means for supporting a fibre to be cleaved, a blade for scoring the fibre to a predetermined depth, means for applying tension along the length of the fibre to cleave the fibre at the scored position, and two hand-operated jaws adapted to be moved towards each other during operaton by manual movement, the jaws being coupled to the blade and the tensioning means in such a manner that a single closing motion of the jaws effects both the scoring and the tensioning operations to achieve cleaving. Preferably the single closing motion of the jaws also effects clamping of the fibre during tensioning, and effects movement of the blade away from the fibre after scoring and before cleaving.

In accordance with a fifth independent aspect of the invention, there is provided cleaving apparatus comprising means for supporting a fibre to be cleaved, and a blade for scoring the fibre to a predetermined depth, prior to cleaving by applying tension along the length of the fibre, in which the apparatus includes means for limiting to a required amount the distance to which the blade may intrude into the fibre by abutment of a stop member against a reference surface, and means for limiting to a required amount the force which may be applied to urge the blade into the fibre during scoring, the force limiting means being adjusted to limit the force applied to the blade to an amount such that excessive scoring is prevented or inhibited in the event of imperfect operation of the distance limiting being means, and the distance limiting means being adjusted to limit the distance the blade can enter the fibre to an amount such that excessive scoring is prevented or inhibited in the event of imperfect operation of the force limiting means.

Those preferred features which have been set out with regard to the first aspect of the invention are also applicable, where not already present, in the other independent aspects of the invention which have been set out.

BRIEF DESCRIPTION OF THE DRAWINGS

Embodiments of the invention will now be described by way of example with reference to the accompanying drawings in which:

FIG. 1d shows the apparatus of the previous figures at a further stage at which the blade is moved away from the fibre;

FIG. 4 shows in diagrammatic perspective view a stop member used in the modified embodiment of FIG 3;

FIG. 6 is an end view of the apparatus of FIG. 3, with a number of components omitted for simplicity, taken in the direction A in FIG. 3 (FIG. 3 being a section along the lines X—X in FIG. 6)-.

DETAILED DESCRIPTION OF THE DRAWINGS

Figure 1A:
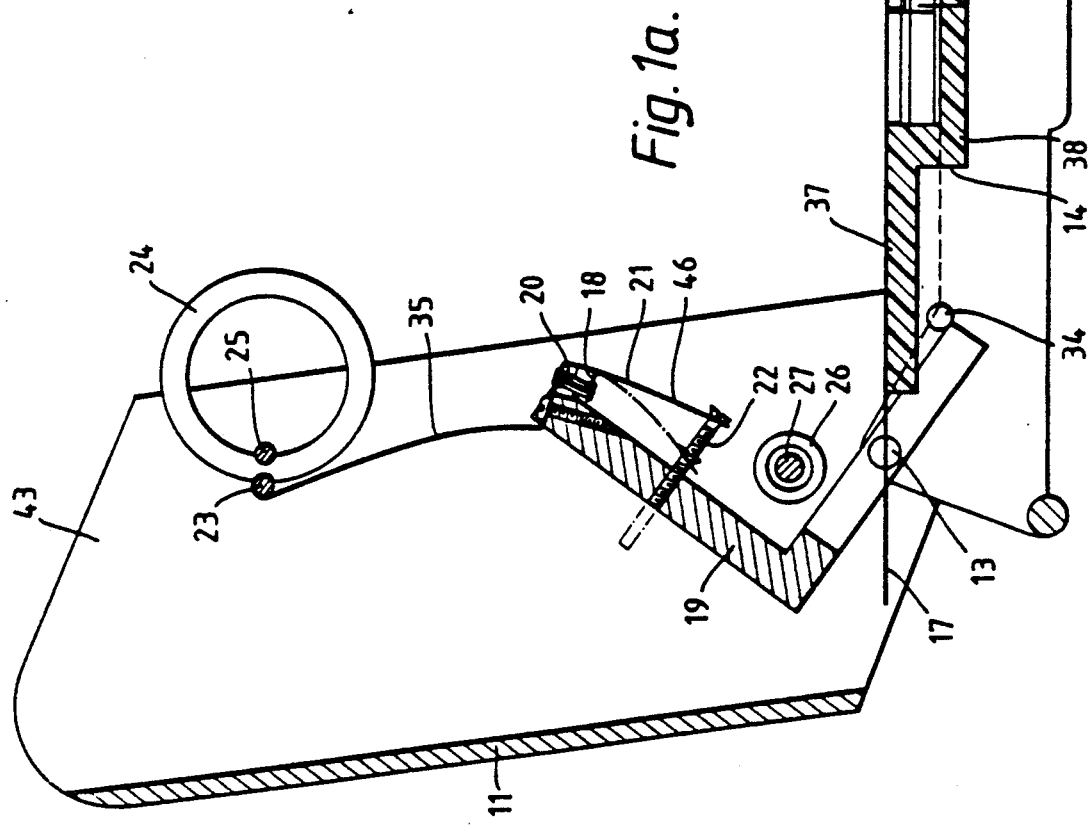
FIG. 1a shows in diagrammatic side section cleaving apparatus embodying the invention at a beginning stage of operation when the apparatus is open.
Figure 1B:
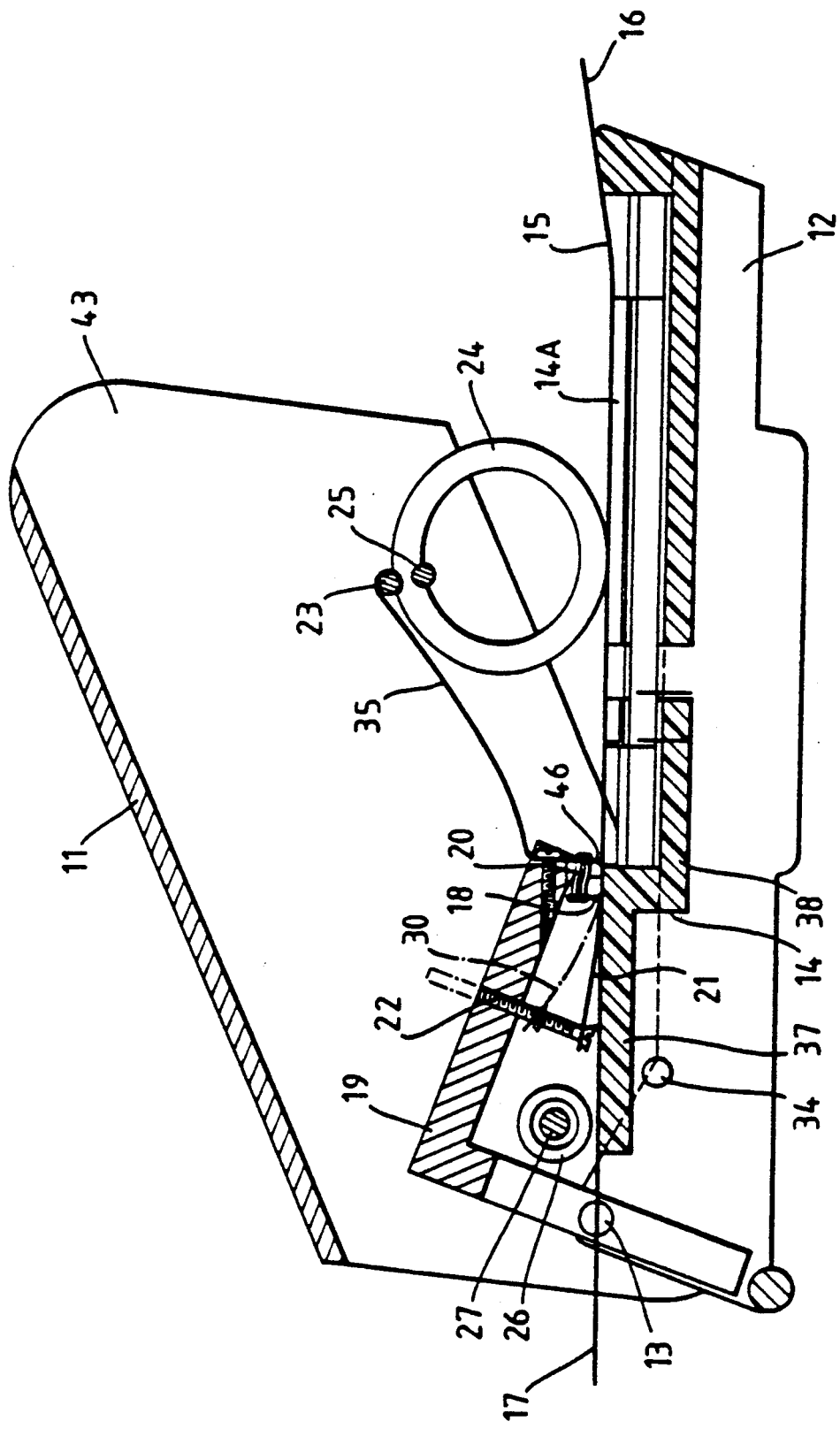
FIG. 1b shows the apparatus of FIG. 1a in a stage of operation where the fibre is being scored.

Referring firstly to FIGS. 1a and 1b, particularly FIG. 1b, apparatus for cleaving an optical fibre comprises two hand-operated jaw 11 and 12 pivotted at a pivot 13. The lower jaw 12 has support means 14 for supporting an optical fibre 15 which is laid along the lower jaw 12, and which has a main end 16 at the distal end of the lower jaw 12, and a waste end 17 at the pivot end of the jaw 12.

Part of the support means 14 consists of a replaceable block 14A having a V shaped slot cut therein of size suitable to locate a given fibre. A series of blocks 14A having differently dimensioned Vs cut therein may interchanged in practice to suit the particular fibre being cleaved.

A blade 18 is resiliently mounted on a blade arm 19 which is itself pivotable about the same pivot 13 as the main jaws 11 and 12. The blade 18 is mounted on the arm 19 by a parallelogram linkage 20 shown more clearly in FIG. 2. The blade 18 is made of a hard single crystal material, for example diamond.

Also mounted on the blade arm 19 is a stop member 21 which is adjustable, as will be explained hereinafter, by an adjustment screw 22. The stop member 21 is formed of a leaf spring 46, which continues as a spring extension 35 from the blade arm 19 towards the distal end of jaw 11. The end of the spring extension 35 is fixedly secured at a cross-member 23, which extends between side walls of the jaw 11, one side wall being shown at 43.

At the distal end of the jaw 11 is a main fibre clamp 24 consisting of a short length of rubber hose fixed between the cross-member 23 and a lower cross-member 25. At the pivot end of the jaw 11 is mounted a further fibre clamp 26 consisting of a small rubber hose around a further cross-member 27.

Figure 2:
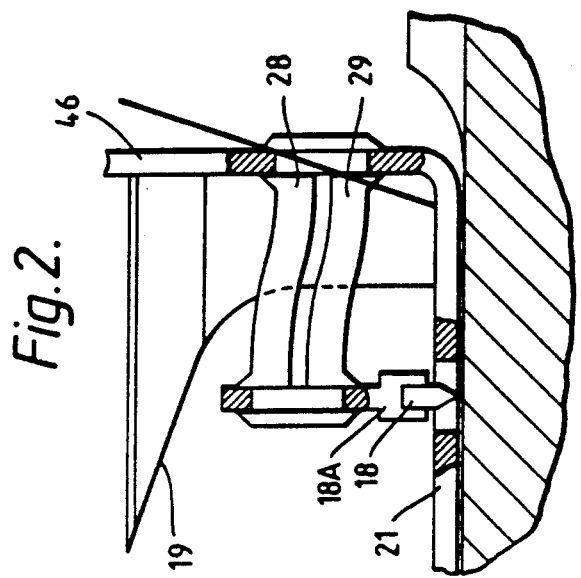
FIG. 2 shows in diagrammatic section an enlarged view of the blade of the apparatus.

Referring to FIG. 2, the blade 18, held in a mount 18A, is mounted on the arm 19 by a parallelogram linkage 20 of two spaced-apart spring members 28 and 29 of rubber, moulded as a single unit.

Referring to FIGS. 1(b) and 2, the stop member 21, constituted by the leaf spring 46, is fixed at one end to the arm 19 and is adjustable by moving a distal end 30 by means of the adjustment screw 22. The effect of upward adjustment of the end 30 of the leaf spring 46 is that the blade 18 protrudes through an aperture (not shown) in the stop member 21 to give the required protrusion of the blade towards the fibre beyond the stop member 21.

The moveable end 30 of the leaf spring 46 follows an approximately parabolic curve, with the result that the adjustment by the screw 22 at the distal end of the spring gives a ratio of fine adjustment at the region of the blade 18 of an amount greater than that which would arise from a simple pivot, that is to say a ratio lying approximately between a square and cube factor for the relationship of change of distance between the screw 22, and the adjustment at the blade 18. This allows an accurate adjustment of the desired depth of protrusion of the blade 18.

The parallelogram linkage 20 of rubber provides a resilient biassing means for urging the blade towards the fibre to be scored.

The parallelogram linkage is arranged to be prestressed, so that the blade 18 is urged downward by against the inner side of the spring 21. This prestressing is arranged to be such that the force by which the blade 18 is urged downwardly when free of the fibre, is substantially equal to the force required to produce the desired scoring. The prestressing is arranged to be such that the prestress force is slightly less than the scoring force, so that some movement of the blade 18 occurs during scoring and the resilient biassing means is deflected to produce the additional force required.

There will now be described the manner of operation of the apparatus.

Referring to FIG. 1a, the apparatus is initially set by opening the jaws 11 and 12 until an extension of the blade arm 19 beyond the pivot point 13 abuts against a lower cross-member 34. Further opening of the jaws moves the extension 35 of the stop member 21 to the curved position shown in FIG. 1a (from an alternative position which will be described hereinafter). In the open position of FIG. 1a, the fibre 15 is placed in position on the support means 14, an outer protective covering having been previously removed to leave the bare fibre in the region to which the blade will descend.

Next the upper jaw 11 is closed down onto the lower jaw 12 until the main fibre clamp 24 clamps the fibre 15 against the support means 14, the clamp 24 touching a part of the fibre on which the outer covering remains. Further closure of the jaws 11 and 12 brings the apparatus to the stage shown in FIG. 1b, where the blade 18 contacts the fibre and enters into the fibre. As the blade first enters it is unyielding due to the prestressing of the resilient biassing means 20.

When the blade has almost completed the score, the force in the blade is greater than the prestressing, and the blade retracts relative to the stop member 21 until the stop member 21 rests on the upper surface of the fibre 15. At this point the score is completed and further closure of the jaws 11 and 12 cannot produce any further scoring.

Figure 1C:
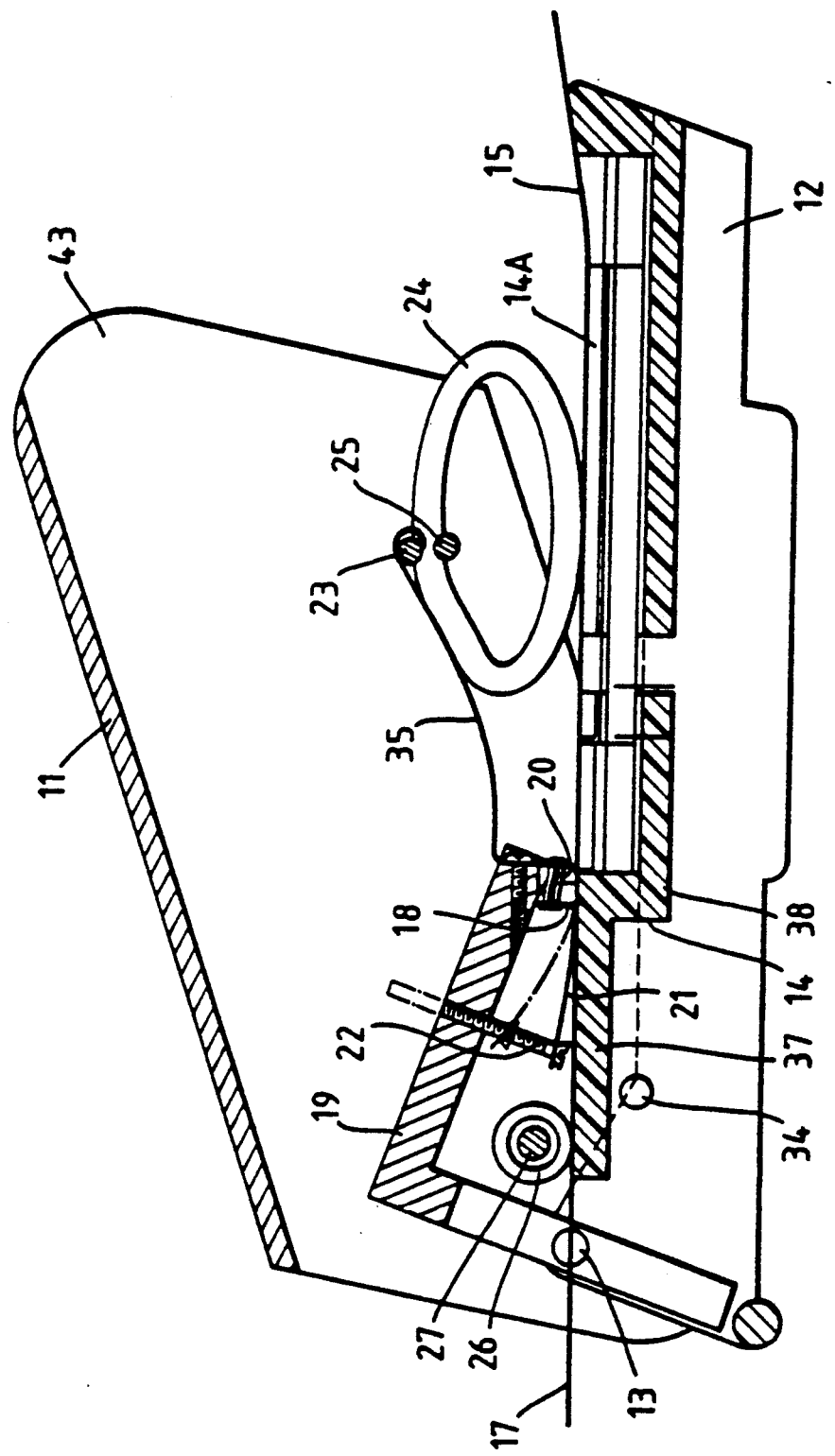
FIG. 1c shows the apparatus of FIGS. 1a and 1b at a further stage of operation after scoring at which the fibre is tensioned.

Further closure of the jaws 11 and 12 brings the device to the stage shown in FIG. 1c, where the small fibre clamp 26 contacts the waste end of the fibre 15, and the main fibre clamp 24 presses against the main end of the fibre 15 with increased force. Also at this stage the stop member 21 presses against the support means 14 until, at a stage shown in FIG. 1 d, the curvature of the extension 35 of the stop member 21 reverses in a toggle action and produces an upward pivotting of the arm 19 about the pivot axis 13, so as to carry the blade 18 away from the scored fibre.

Figure 1E:
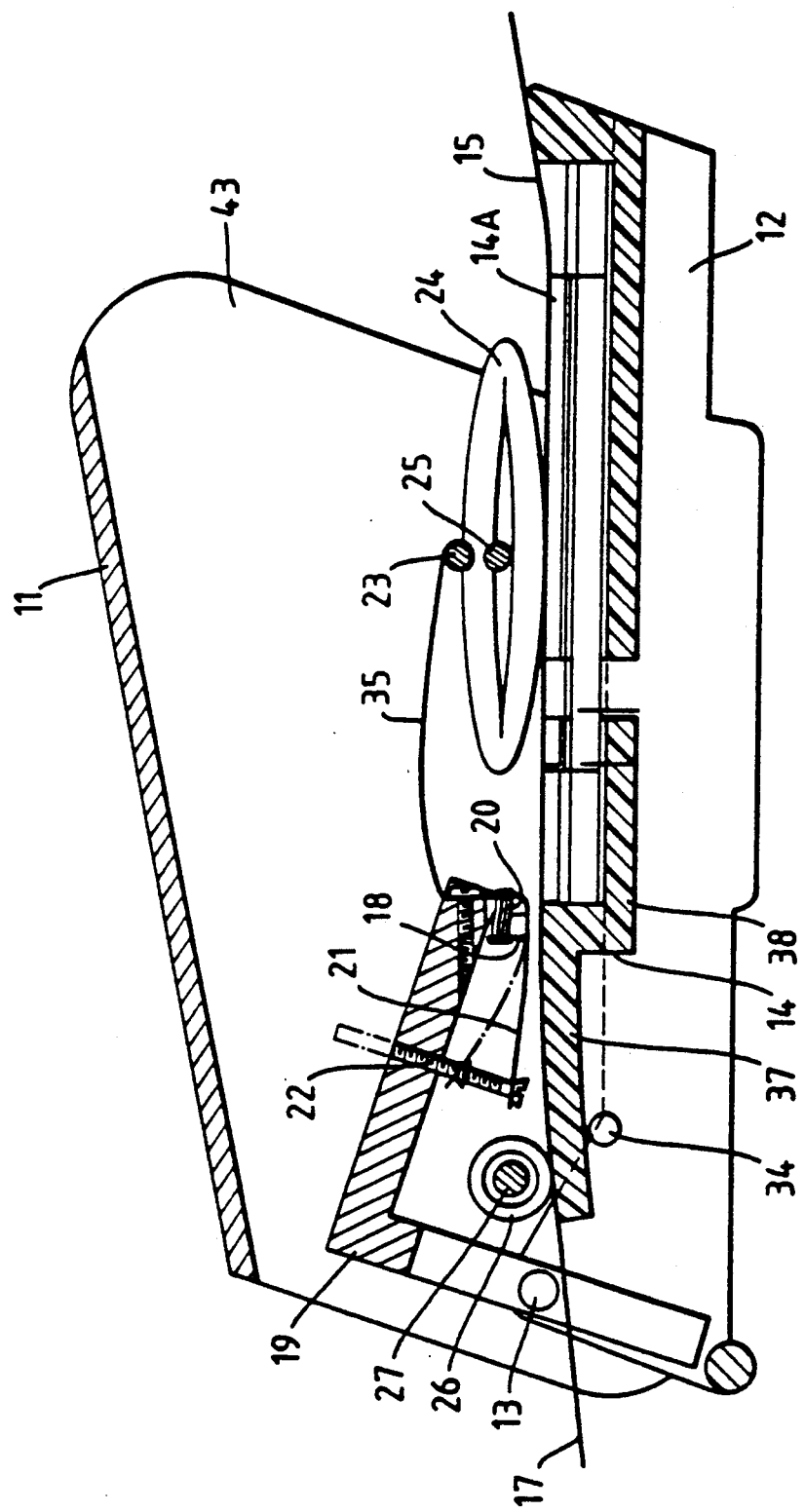
FIG. 1e shows the apparatus of previous figures at a further stage at which the fibre is cleaved.

Continued closure of the jaws 11 and 12 brings the device to the stage shown in FIG. 1e. In this stage the small fibre clamp 26 presses a moveable portion 37 of the support means 14 downwardly relative to a main portion 38 which is stationary relative to the lower jaw 12. The moveable portion 37 moves by virtue of being a cantilevered portion of bendable material such as synthetic plastics material. This bending motion produces the required longitudinal tension in the fibre until cleaving takes place at the scored region.

The next stage (not shown) is that the jaws 11 and 12 are opened to release the cleaved fibre. Thereafter the jaws are opened wide as shown in FIG. 1a to reverse the curvature of the spring extension 35 to that shown in FIG. 1a.

Various advantages arise with the embodiment which has been described. The effective portion of the stop member 21 is positioned closely adjacent to the blade 18, and rests on the upper surface of the fibre. In a typical optical fibre of diameter 0.125 mm, the factory tolerance will typically be 0.003 mm, which is the same as the desired scoring depth, i.e. 0.003 mm. If the stop member 21 were to rest on the support means 14 as a reference surface, the required precision setting of the blade for an intrusion the blade for an intrusion of 0.003 mm would be subject to an error of up to 100%, since the upper surface of the fibre would have a position variation of the same amount (relative to the surface of the support means on which it rests as the blade intrusion). By abutting the stop member 21 against the upper surface of the fibre, the depth setting of the blade during scoring can be made substantially independent of the manufacturers' diameter error. The blade is positioned as close as possible to the effective portion of the stop member 21 to avoid the effect of local variations in the upper surface of the fibre, and also to avoid inaccuracies due to temperature variation which cause shifting of the stop member relative to the blade when used in adverse ambient conditions. If the blade and stop member are kept close together, the effect of temperature change is likely to be the same on both the blade and the stop member.

The pretensioning of the blade has the advantage that the blade is in contact with the fibre for less time than would be the case if the blade touched the fibre initially with no pre-stressing and was in contact with the blade while the blade moved against the spring mounting 20 until the spring mounting had been compressed sufficiently to force the blade into the fibre.

It is an object of the invention to reduce the time that the blade is in contact with the fibre, since during this time the blade is open to minor movements in a plane perpendicular to the plane of the blade, for example due to jogging or errors in the parallel motion of the parallelogram linkage 20.

The blade is arranged to yield upwardly before the full scoring depth has been reached, since it is important for some movement against the resilient biassing means to take place before full scoring force is applied. This is necessary to ensure repeatability of the calculated force to be exerted by the resilient biassing means. However in general it is preferred to arrange for the blade mounting to be prestressed to a stage such that the downward force exerted on the blade before yielding begins is substantially equal to the required scoring force, for example is equal to 90% of the required scoring force. A concomitent of this condition is that the blade protrudes from the stop means by an amount substantially equal to, but slightly greater than, the required depth of scoring, for example the blade may be arranged to protrude by approximately 110% of the required scoring depth.

By way of example, the resilient biassing means 20 may be set to apply to the blade a force of 0.046 Newtons when the blade protrudes from the stop member by 5 microns, because a force of 0.046 Newtons is calculated to give a penetration of 5 microns into a typical silica glass fibre of 0.125 mm diameter, assuming a blade sharpness of 60° included angle for the blade. The required depth of intrusion will usually be chosen in the range 3 to 5 micons, and the force calculation will be made accordingly.

Another advantage of the present invention is that the sharpness of the blade can be maintained for a longer period than in prior art devices.

A scoring depth required to achieve cleaving depends upon both the depth of the score, and also the sharness of the crack produced in the score. If the crack is sharp, a lower depth of intrusion is required. Because the present invention allows a more accurate control over the depth of score, a lower required depth can be set, in the knowledge that the blade will remain sharp so that a sufficiently sharp shallow crack will be formed. In the prior art, due to uncertainty of depth, a greater depth had to be set for safety, and this quickly reduced the sharpness of the blade, which in turn required a deeper score to be made. In general, a better cleave is obtained by having a shallower score, but with a sharper crack in the score. Therefore it is better to use a sharp blade and arrange for a smaller, controlled, intrusion of the blade into the fibre.

A preferred range of operation of the apparatus is that the blade is arranged to protrude from the stop means by an amount in the range 2 to 10 microns, preferably 3 to 5 microns, and that the maximum force applied to the blade by the resilient mounting means before the stop means touches the top surface of the fibre, is in the range 0.01 to 0.10 Newtons, preferably in the range 0.02 to 0.07 Newtons.

There is a minimum depth of score which is required, of the order of two microns for typical optical fibres, because score depths less than this may require a delay during tensioning before cleaving takes place.

Another advantage of the apparatus shown is that the so called waste end of the fibre may be of any length, the fibre being able to be passed through the pivotted ends of the jaws. Thus a cleave can be made in a long fibre, both cut portions being useable, if this is required.

Furthermore, the lower jaw of the apparatus can be made with a simple, flat, shape, allowing easy cleaning, without recesses into which scrap fibre can be trapped.

Turning now to FIGS. 3 to 6, there will be described a modification of the embodiment described with reference to the previous figures. Components in FIGS. 3 to 6 which perform corresponding functions to components in the previous figures are indicated by like reference numerals.

Figure 3:
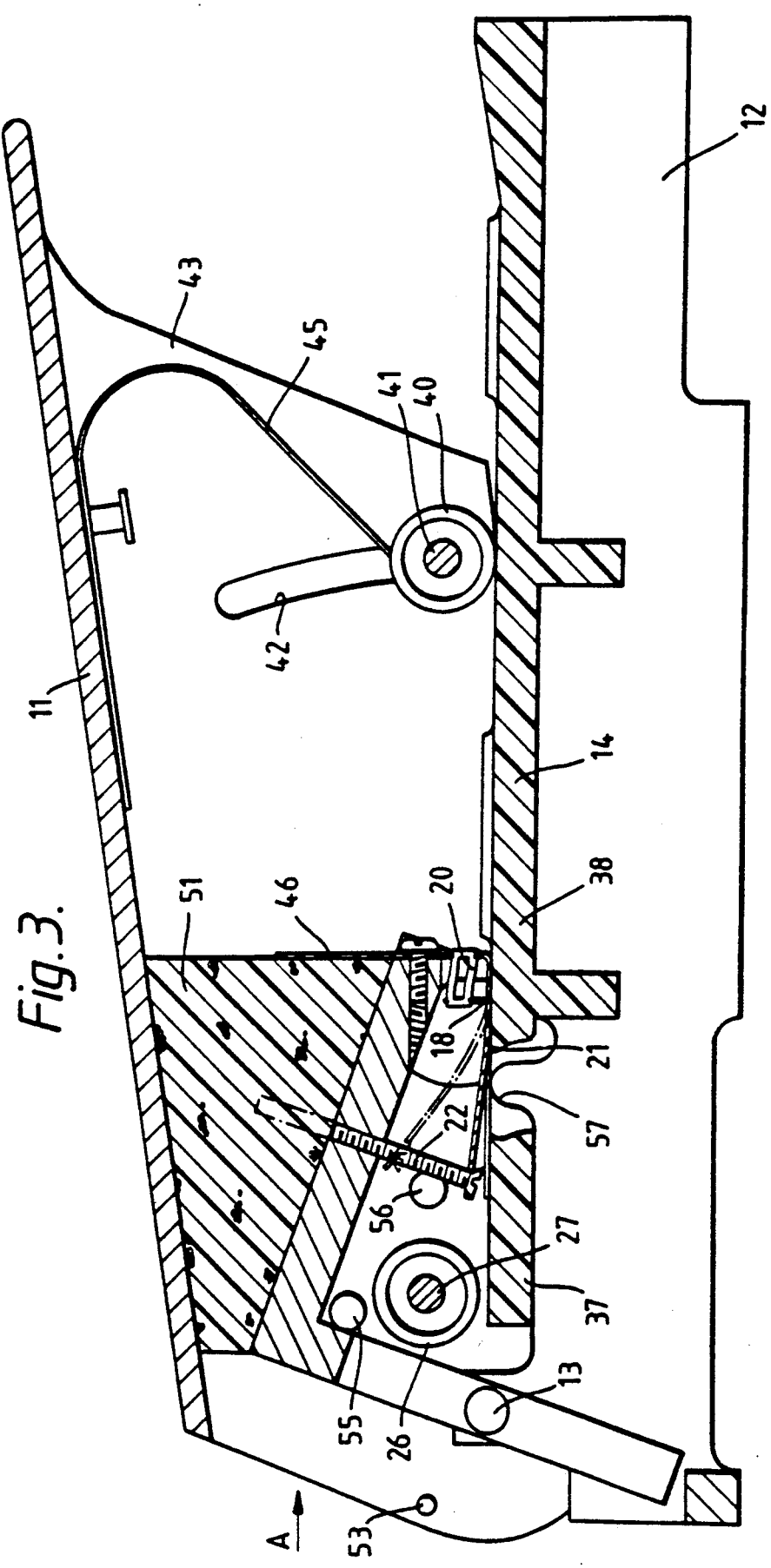
FIG. 3 shows in side-section a modificaton of the apparatus of the previous figures.
Figure 5:
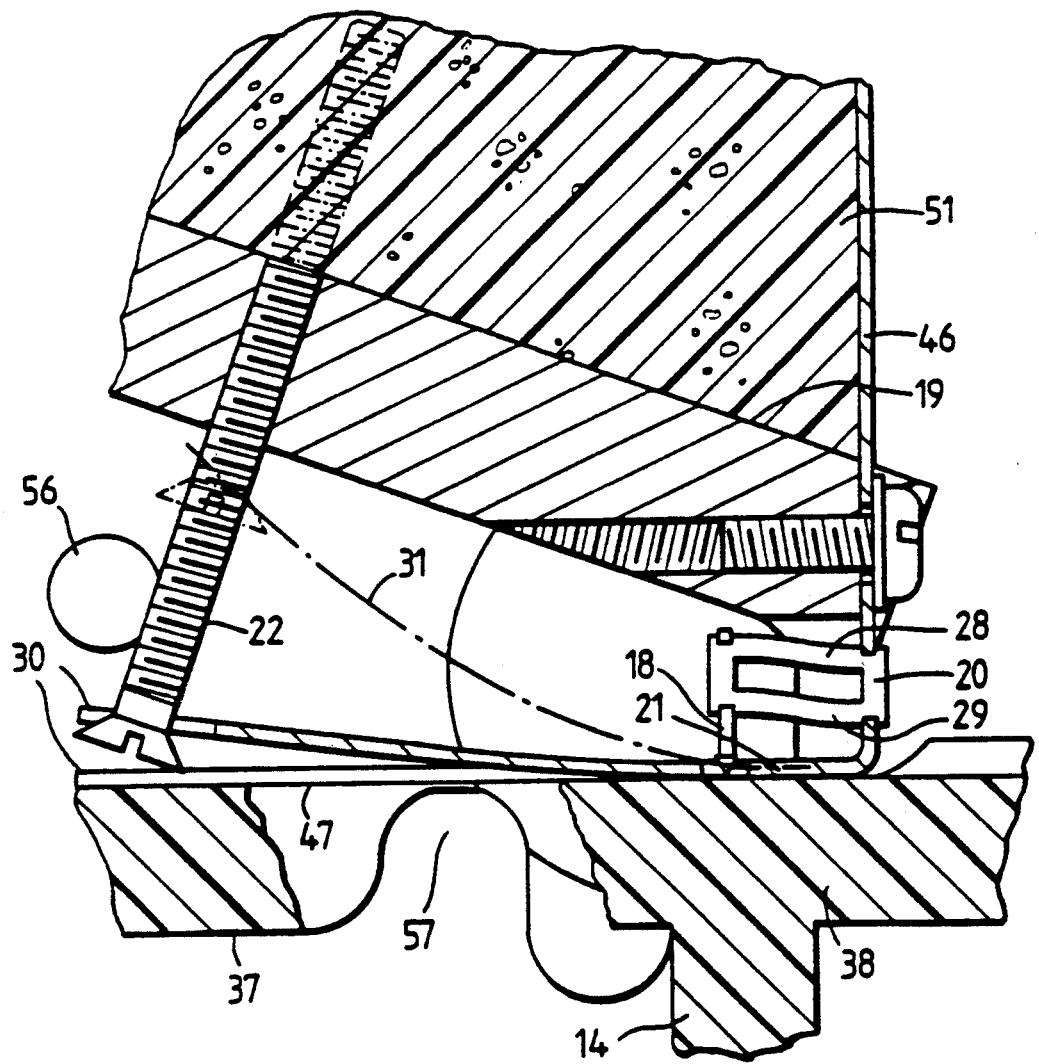
FIG. 5 shows in section an enlarged view of the blade of the modified embodiment of FIG. 3.

Referring to FIG. 3, the main fibre clamp 24 of the previous figures is replaced by a main fibre clamp comprising a rubber cylinder 40 mounted on a shaft 41 set in a slot 42 in each of the two sides 43 of the upper jaw 11. A clamping spring 45 is fixedly secured to the underside of the upper part of the jaw 11 and is bent as shown to bear against the upper side of the shaft 41 so as to urge the shaft 41 downwardly in the slot 42. During closure of the jaws 11 and 12, the rubber cylinder 40 presses downwardly upon the fibre, at first with a light force during the scoring stage, but then with a greater force during the cleaving stage. The shape of the slot 42 and the position of the clamping spring 45 are selected so that the force applied is firstly a light force, increasing to the required higher force, and then being maintained at a substantially constant force during cleaving. This arises because the effective application point of the force on the spring 45 moves towards the distal end of the jaw 11 during closing of the jaws 11 and 12.

Another modification is that the stop member 21 consists of a spring of different shape, as is shown in FIG. 4. The stop member 21 is formed from an overall spring member 46 which has three arms 47, 48 and 49 linked by a cross portion 50.

The three arms 47, 48 and 49 are each bent at right angles part way along their length, as shown. The central arm 48 operates as a stop member 21 in the same manner as the spring 46 in the previous embodiment. The two outer arms 47 and 49 extend freely at right angles to the portion 50, when the jaws 11 and 12 are open. The central arm 48 is bent upwardly by the adjustment screw 22, and its position adjusted thereby as in the previous embodiment.

The free arms 47 and 49 of the spring member 46, area arranged to co-operate during operation with two short pins or bosses 56 projecting inwardly from respective sides 43 of the upper jaw 11. Initially the bosses 56 are spaced from the arms 46, but at a later stage in operation, as will be described hereinafter, the bosses 56 contact the arms 47 and 49 respectively.

Another modification of the embodiment of FIG. 3 compared with the previous embodiments, is that there is positioned on the lower jaw 12 two further bosses 57, one on each inner side of the jaw 12, with a space between the two bosses 57 in which is situated the moveable portion 37 of the support means 14. In FIG. 3, the section of the support means 14 is broken in the region of the bosses 57, so as to show the far boss 57 on the inner side of the lower jaw 12, which would otherwise be obscured by the moveable portion 37 of the support means 14.

Referring again to the upper jaw 11, the blade arm 19 is located by, and fastened to, a block of slow-recovery foam 51 (in place of the spring extension 35 in the previous embodiment). The foam 51 extends between the upper surface of the blade arm 19, and the under surface of the jaw 11.

The slow recovery foam 15 is slightly prestressed, so as to urge the blade arm 19 against a cross member 55 which extends between the two side walls 43 of the upper jaw 11, just above the fibre clamp 26.

FIG. 6 shows and end view of the apparatus of FIG. 3, but with a number of components removed for simplicity. FIG. 6 shows particularly the relationship between the boss 27 on which the fibre clamp 26 (not shown) is mounted, and a smaller boss 53 which is provided at the rear end of the jaw 11, to prevent overopening of the jaws, by co-operation with the lower jaw 12.

There will now be described the operation of the embodiment of FIGS. 3 to 6. However the general operation of this embodiment is the same as that of the previous embodiment, and common steps in the operation will not be described again in detail.

The jaws 11 and 12 are first opened, and the fibre 15 is laid along the support means 14, in the appropriate groove 14B, shown in FIG. 6. The jaws 11 and 12 are closed, and the fibre clamp 40 presses lightly against the fibre 15, holding it against the support means 40.

The blade 18 touches the fibre 15, and yields marginally relative to the stop member 21, until the stop member 21 rests against the upper surface of the fibre 15. At this time the score has been completed.

Further compression of the jaws 11 and 12 presses the fibre clamp 14 more tightly against the fibre, the cross member 41 rising along the slot 42.

At the same time the fibre clamp 26 presses the fibre 15 against the moveable portion 37 of the support means 14, and begins to bend the moveable portion 37 downwardly relative to the fixed portion 38. Next the bosses 56 on the upper arm 11 contact the upper surface of the side arms 47 and 49 (as shown in FIG. 4). Further downward movement of the jaw 11 caused pivotting of the blade arm 19 upwardly against the foam 51, by the effect of the moment of the forces applied to the side arms 47 and 49 of the spring 46 by the downwardly moving bosses 56, and the fixed bosses 57 on the lower jaw 12. This upward movement of the blade arm 19 carries the mounting 20, the blade 18, and the effective part of the stop member 21 away from the upper surface of the fibre 15, in the region in which scoring has been made. This removal of the blade 18 from the score before final cleaving is important, as it reduces the chances of unwanted scraping or other contact of blade 18 with the fibre after the score has been made.

The next stage is that further closure of the jaws 11 and 12 bends the moveable portion 13 of the support means 14 downwardly, and applies longitudinal tension along the fibre 15 by virtue of the clamping of the fibre by the clamps 26 and 40. Cleaving of the fibre then takes place, and the jaws 11 and 12 are opened to release the cleaved fibre and the waste portion for disposal. The blade arm 46 gradually returns to the required position as the foam 51 recovers. The delayed return of the blade 18 is important because it prevents the blade making any further contact with the fibre during opening of the jaws 11 and 12.

Figure 7:
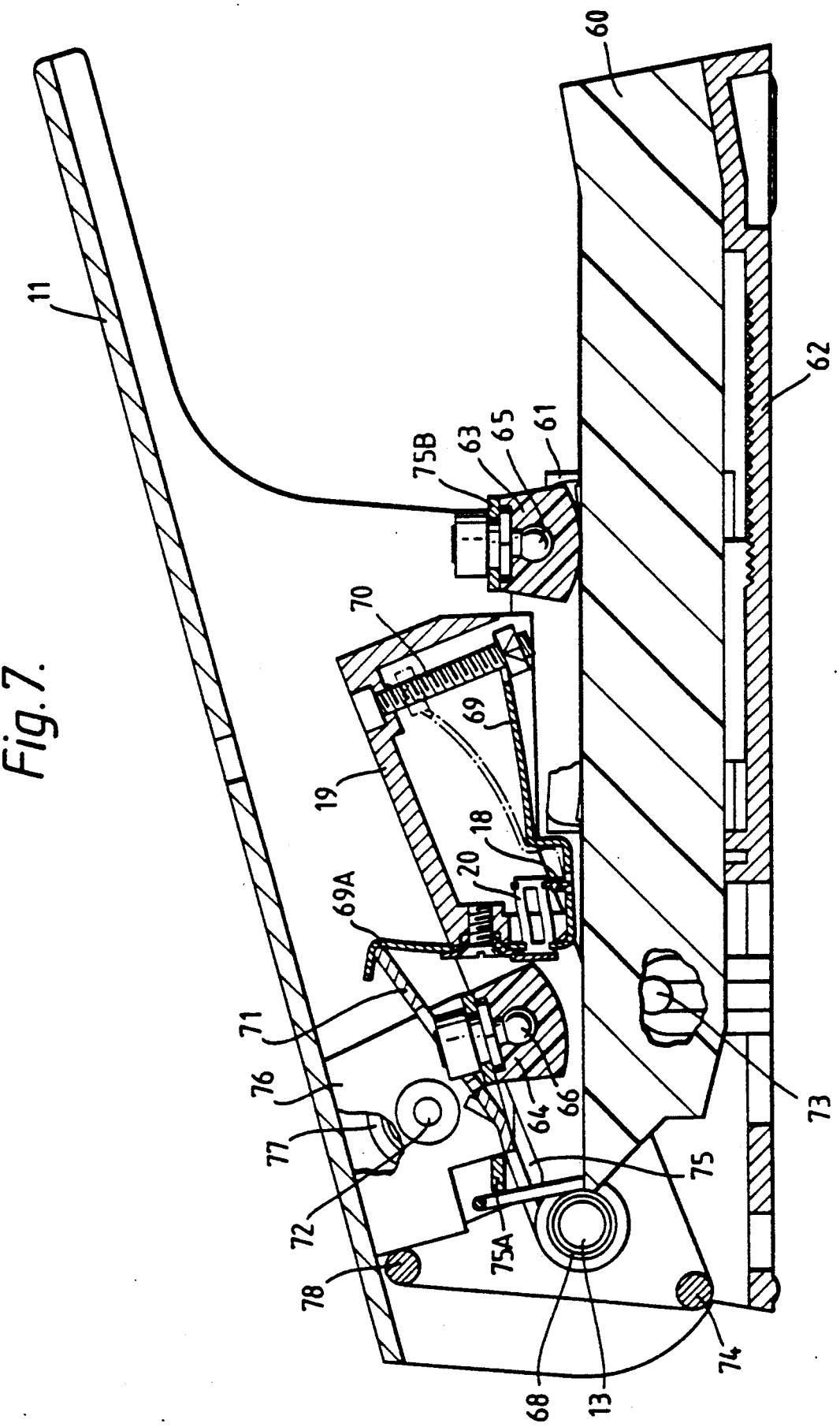
FIG. 7 shows an alternative embodiment.

Referring now to FIG. 7, an alternative embodiment of the apparatus functions in a similar manner to that previously described in so far as all movements are about a common pivot 13 and scoring depth is referenced to the top surface of the fibre.

In this embodiment the cleaver comprises four sub assemblies namely a lower jaw (60, 61, 62) a middle jaw (63, 65, 75), an inner jaw (18, 19, 20, 69, 70, 74, 78) and an outer jaw (11, 72, 76, 77).

The lower jaw comprises a base member 60 of polyurethane for example which carries a fibre mounting frame 61. The fibre mounting frame 61 has a first groove towards the distal end dimensioned to accept a coated fibre, the first groove connecting to a second groove towards the hinge end. The second groove is dimensioned to accept a stripped fibre. The fibre mounting frame 61 is linked to an adjuster 62 whereby it may be moved with respect to the base 60 so that cleaving of the fibre occurs at a predetermined distance from the end of the fibre coating.

The fibre clamp members comprises polyurethane blocks 63, 64 respectively attached to the middle jaw 75 and the inner clamp bracket 76 by ball joints 65, 66.

In use, a torsion spring 68 provides a clamping force to ensure that the block 63 holds the fibre in position in the fibre mounting frame 61. The spring 68 acts between a spacer member 77 of the outer jaw and a part 75A of the middle jaw.

As for the previous embodiment the blade arm 19 carries a stop member in the form of a spring 69 linked to the arm by a depth adjuster 70. In operation, the cleaver functions in a similar manner to that hereinbefore described up to and including the point at which scoring of the fibre is completed. Once scoring to the preset depth has occured, further closure of the jaw 11 causes a link arrangement 71 to overcentre. The overcentring action causes the blade arm 19 to withdraw upwardly thereby causing the blade 18 to withdraw clear of the fibre being cleaved. The inner clamp brackets 76 of the outer jaw limits the movement of the aforementioned arm 19.

As for the previously described embodiment, the rearward clamping block 64 now tensions the fibre to effect cleaving. During the tensioning operation, the hinge end of the polyurethane block 60 is flexed downwardly and is captured by a ball 73 and socket arrangement, the socket being in the block. The resilience of the material of the block 60 provides tensioning for this interlocking arrangement.

The cleaved fibre may now be removed from the apparatus by opening the jaw 11. Further opening of the jaw 11 causes a spigot 74 to connect with the block 60 such that, on fully opening the apparatus the hinge end is released from the ball 73 and the over centred link 71 is reset.

For the avoidance of doubt it is here noted that the outer jaw sub assembly and inner jaw sub assembly are interlinked by way of the link arrangement 71 and the upper portion (69A) of the spring 69. On opening the apparatus, movement of the inner jaw is limited by a cross member 78 interacting with the edge of the clamp bracket 76, whilst in the opposed direction movement of the inner jaw is limited by the blade arm 19 contacting the inside of the jaw 11.

It will also be appreciated that limitation of the movement of the middle and outer jaws with reference to the lower jaw is required. In the case of the middle jaw the first limit of movement is due to interaction between the end 75A of a link arm (partly visible at 75A and 75B) and an edge of the bracket 76. In the opposed direction the long upper edge of the link arm 75 comes up against the bottom of the spacer 77 to limit the movement.

Considering the outer jaw the limitation of movement in one direction occurs because the polyurethane block 63 contacts the block 60. In opening the apparatus the outer jaw is limited at substantially 90° to the lower jaw because the cross member 74 contacts the under side of the block 60 although this limitation occurs only after the inner jaw toggles back over centre causing the limitation of movement of the inner jaw as hereinbefore described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. Apparatus for use in cleaving optical fibers comprising: means including a support surface having a longitudinal groove for supporting a fiber to be cleaved, a blade having a cutting edge for scoring the fibre to a predetermined depth, prior to cleaving by the application of tension along the length of the fiber, distance limiting means including a stop member arranged to abut a reference surface to define a limiting position above the support surface of closest approach thereto of the cutting edge, means for adjusting the distance limit effected by the abutment of the stop member against the reference surface, and means for limiting the force which may be applied to urge the blade into the fiber during scoring.

2. Apparatus according to claim 1 in which the stop member is arranged in operation to abut against the surface of the fibre on that side of the fibre which is to be scored, which fibre surface constitutes the said reference surface.

3. Apparatus according to claim 2 in which the blade protrudes towards the fibre in operation beyond the stop member by a distance of the same order of magnitude as the distance to which the blade is intended to intrude into the fibre during scoring.

4. Apparatus according to claim 3 in which the blade protrudes towards the fibre in operation beyond the stop member by a distance substantially equal to the distance the blade is intended to intrude into the fibre during scoring.

5. Apparatus according to claim 1 including means for applying tension along the length of the fibre to cleave the fibre at the scored position.

6. Apparatus for use in cleaving optical fibres comprising: means for supporting a fibre to be cleaved, a blade for scoring the fibre to a predetermined depth, prior to cleaving by the application of tension along the length of the fibre, said apparatus further including means for limiting the distance to which the blade can approach the supporting means by abutment of a stop member against a reference surface, means for adjusting the distance limit effected by the abutment of the stop member against the reference surface, means for limiting the force which may be applied to urge the blade into the fibre during scoring, and means for adjusting the position of the stop member relative to the blade.

7. Apparatus according to claim 6 in which the stop member comprises a leaf-spring which is fixed at one end and which is arranged to abut the reference surface close to the fixed end of the leaf-spring, the adjustment means being arranged to vary the position of the end of the leaf spring remote from the fixed end.

8. Apparatus for use in cleaving optical fibres comprising: means for supporting a fibre to be cleaved, a blade for scoring the fibre to a predetermined depth, prior to cleaving by the application of tension along the length of the fibre, said apparatus further including means for limiting the distance to which the blade can approach the supporting means by abutment of a stop member against a reference surface, means for adjusting the distance limit effected by the abutment of the stop member against the reference surface, and means for limiting the force which may be applied to urge the blade into the fibre during scoring, said limiting means comprising resilient biasing means for urging the blade towards the fibre, the biasing means being arranged to be yieldable when the force applied during scoring has reached the required limit.

9. Apparatus according to claim 8 in which the biasing means is arranged to be yieldable before there force applied during sxoring has reached the required limit.

10. Apparatus according to claim 8 in which the resilient biassing means is pre-stressed so as to be unyielding during initial intrusion of the blade into the fibre.

11. Apparatus according to claim 8 in which the resilient biassing means comprises a parallelogram linkage of two spaced-apart spring members allowing movement of the blade parallel to a mount against a resilient biassing force provided by the two spring members.

12. Apparatus according to claim 8, in which the fibre support means includes locating means which limits the longitudinal position of the fibre whereby cleaving occurs at a predetermined distance from the end of the fibre cladding.

13. Apparatus according to claim 12 is which the fibre support means is longitudinally moveable with respect to the blade.

14. Apparatus for use in cleaving optical fibres comprising: means for supporting a fibre to be cleaved, a blade for scoring the fibre to a predetermined depth, prior to cleaving by the application of tension along the length of the fibre, said apparatus further including means for limiting the distance to which the blade can approach the supporting means by abutment of a stop member against a reference surface, means for adjusting the distance limit effected by the abutment of the stop member against the reference surface, means for limiting the force which may be applied to urge the blade into the fibre during scoring, means for applying tension along the length of the fibre to cleave the fibre at the scored position, and two hand-operated jaws adapted to be moved towards each other during operation by manual movement, the jaws being coupled to the blade and the tensioning means in such a manner that a single closing motion of the jaws effects both the scoring and the tensioning operations to achieve cleaving.

15. Apparatus according to claim 14 in which the single closing motion of the jaws also effects clamping of the fibre during tensioning, and effects movement of the blade away from the fibre after scoring and before cleaving.

16. Apparatus according to claim 14 including first and second clamping means for clamping respectively the main portion and the waste portion of the fibre with the blade positioned between the two clamping means, the jaws being coupled to the clamping means in such a manner that closing of the jaws applies the said clamping means to the fibre automatically.

17. Apparatus according to claim 14 in which the clamping means are bearing mounted to permit limited lateral movement with respect to the jaws.

18. Apparatus for use in cleaving optical fibres comprising: means for supporting a fibre to be cleaved, a blade for scoring the fibre to a predetermined depth, prior to cleaving by the application of tension along the length of the fibre, said apparatus further including means for limiting the distance to which the blade can approach the supporting means by abutment of a stop member against a reference surface, means for adjusting the distance limit effected by the abutment of the stop member against the reference surface, means for limiting the force which may be applied to urge the blade into the fibre during scoring, and means for applying tension along the length of the fibre to cleave the fibre at the scored position, the tensioning means comprising a movable portion of the fibre support means which is movable by pivoting or bending relative to a main portion of the fibre support means to tension the fibre across the pivot ior bend region.

19. Apparatus according to claim 18 in which locking means retains the moveable portion of the fibre support means in a displaced position until manually reset.

20. Apparatus according to claim 1 in which the fibre support means includes locating means which limits the longitudinal position of the fibre whereby cleaving occurs at a predetermined distance from the end of the fibre cladding.

21. Apparatus according to claim 11 in which the fibre support means includes locating means which limits the longitudinal position of the fibre whereby cleaving occurs at a predetermined distance from the end of the fibre cladding.

22. Apparatus according to claim 1, in which the part of the stop member which abuts the reference surface in operation is positioned closely adjacent the blade.

* * * * *